United States Patent
Han et al.

(10) Patent No.: US 8,320,907 B2
(45) Date of Patent: Nov. 27, 2012

(54) METHOD FOR PERFORMING CELL SEARCH PROCEDURE IN WIRELESS COMMUNICATION SYSTEM

(75) Inventors: Seung Hee Han, Anyang-si (KR); Ki Ho Nam, Anyang-si (KR); Min Seok Noh, Anyang-si (KR); Jin Sam Kwak, Anyang-si (KR); Hyun Woo Lee, Anyang-si (KR); Dong Cheol Kim, Anyang-si (KR); Seong Ho Moon, Anyang-si (KR); Sung Gu Cho, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 12/808,016

(22) PCT Filed: Dec. 17, 2008

(86) PCT No.: PCT/KR2008/007479
§ 371 (c)(1),
(2), (4) Date: Jun. 14, 2010

(87) PCT Pub. No.: WO2009/078664
PCT Pub. Date: Jun. 25, 2009

(65) Prior Publication Data
US 2010/0261472 A1    Oct. 14, 2010

Related U.S. Application Data

(60) Provisional application No. 61/014,423, filed on Dec. 17, 2007.

(30) Foreign Application Priority Data

Jun. 5, 2008    (KR) .................. 10-2008-0052870

(51) Int. Cl.
*H04W 4/00* (2009.01)
*H04B 7/216* (2006.01)

(52) U.S. Cl. ......... 455/434; 370/329; 370/335; 370/342

(58) Field of Classification Search .............. 455/434, 455/435.1, 455; 370/329, 335, 342
See application file for complete search history.

(56) References Cited

U.S. PATENT DOCUMENTS

| | | | |
|---|---|---|---|
| 8,031,745 B2 * | 10/2011 | Onggosanusi et al. | 370/503 |
| 2007/0025428 A1 | 2/2007 | Hahm et al. | |
| 2007/0116166 A1 | 5/2007 | Parts et al. | |
| 2007/0177535 A1 | 8/2007 | Zalio | |
| 2007/0189259 A1 | 8/2007 | Sollenberger | |
| 2008/0045228 A1 * | 2/2008 | Zhang et al. | 455/450 |
| 2008/0132263 A1 * | 6/2008 | Yu et al. | 455/515 |
| 2010/0091907 A1 * | 4/2010 | Noh et al. | 375/302 |

* cited by examiner

*Primary Examiner* — George Eng
*Assistant Examiner* — Nam Huynh
(74) *Attorney, Agent, or Firm* — McKenna Long & Aldridge LLP

(57) ABSTRACT

A method for performing a cell search procedure by a user equipment in a wireless communication system includes receiving a primary synchronization signal (PSS), and obtaining a correlation value of the PSS to detect a multimedia broadcast multicast service (MBMS) indicator indicating whether a service is a dedicated MBMS. Accordingly, whether the service is the dedicated MBMS is indicated using a primary synchronization signal or a secondary synchronization signal used in an initial cell search process, and whether the service is the dedicated MBMS can be known without additional complexity. Therefore, cell search of a user equipment can be more effectively performed.

5 Claims, 7 Drawing Sheets

METHOD FOR PERFORMING CELL SEARCH PROCEDURE IN WIRELESS COMMUNICATION SYSTEM

This application is a national phase application based on International Application No. PCT/KR2008/007479, filed on Dec. 17, 2008, which claims priority to U.S. Provisional Application No. 61/014,423, filed on Dec. 17, 2007 and Korean Patent Application No. 10-2008-0052870, filed on Jun. 5, 2008, all of which are incorporated by reference for all purposes as if fully set forth herein.

TECHNICAL FIELD

The present invention relates to wireless communications, and more particularly, to a method for performing a cell search procedure by a user equipment.

BACKGROUND ART

Wide code division multiple access (WCDMA) systems of the $3^{rd}$ generation partnership project (3GPP) use a total of 512 long pseudo-noise (PN) scrambling codes in order to identify base stations (BSs). As a scrambling code of a downlink channel, each BS uses a different long PN scrambling code.

When power is supplied to a user equipment (UE), the UE performs system synchronization of an initial cell and acquires a long PN scrambling code identify (ID) of the initial cell. Such a process is referred to as a cell search procedure. The initial cell is determined according to a location of the UE at a time when the power is supplied. In general, the initial cell indicates a cell of a BS corresponding to the greatest signal component among signal components of all BSs, wherein the signal components are included in a downlink reception signal of the UE.

To facilitate the cell search procedure, a WCDMA system divides the 512 long PN scrambling codes into 64 code groups, and uses a downlink channel including a primary synchronization channel (P-SCH) and a secondary synchronization channel (S-SCH). The P-SCH is used to allow a UE to acquire slot synchronization. The S-SCH is used to allow the UE to acquire frame synchronization and a scrambling code group.

In general, cell search is classified into initial cell search, which is initially performed when the UE is powered on, and non-initial search which performs handover or neighbor cell measurement.

In the WCDMA system, the initial cell search is accomplished in three steps. In the first step, the UE acquires slot synchronization by using a primary synchronization signal (PSS) transmitted through the P-SCH. In the WCDMA system, a frame includes 15 slots, and each BS transmits the frame by including the PSS to the frame. Herein, the same PSS is used for the 15 slots, and all BSs use the same PSS. The UE acquires the slot synchronization by using a matched filter suitable for the PSS. In the second step, a long PN scrambling code group and frame synchronization are acquired by using the slot synchronization and a secondary synchronization signal (SSS) transmitted through the S-SCH. In the third step, by using a common pilot channel code correlator on the basis of the frame synchronization and the long PN scrambling code group, the UE detects a long PN scrambling code ID corresponding to a long PN scrambling code used by the initial cell. That is, since 8 long PN scrambling codes are mapped to one long PN scrambling code group, the UE computes correlation values of all of the 8 long PN scrambling codes belonging to a code group of the UE. On the basis of the computation result, the UE detects the long PN scrambling code ID of the initial cell.

Meanwhile, a multimedia broadcast multicast service (MBMS) is a service in which a plurality of BSs transmit the same downlink signal in a single frequency network (SFN) system. The MBMS can obtain an SFN combining gain between cells by performing a multicast broadcast single frequency network (MBSFN) operation. The SFN combining gain denotes a diversity gain obtained in a receiving end by transmitting the same information for each cell without an extra operation. When the plurality of BSs transmit the same signals, the same signals transmitted from multiple cells act as self signals instead of acting as inter-cell interference. As a result, the same effect as multipath fading is produced, and thus a frequency diversity gain and a macro diversity gain can be obtained. On the other hand, a unicast service is a service in which a UE accesses to a BS to transmit/receive data from/to the BS. In a specific cell, only the unicast service may be provided, or the MBMS may be provided together with the unicast service, or only the MBMS may be provided. When only the MBMS is provided, it is called a dedicated MBMS.

In an initial cell search process, the UE cannot know whether a service provided in a cell is a unicast service or a dedicated MBMS. The BS transmits basic system configuration information through a physical broadcast channel (P-BCH). When information indicating whether the service of the cell is the dedicated MBMS is transmitted through the P-BCH, the UE obtains service information of a system by performing blind decoding on the unicast service and the dedicated MBMS through the P-BCH. This may result in system performance deterioration by delaying an operation time of the initial cell search process of the UE.

Accordingly, there is a need for a method capable of more effectively performing cell search by a UE in a wireless communication system in which a unicast service and an MBMS can coexist.

DISCLOSURE OF INVENTION

Technical Problem

The present invention provides a method for performing a cell search procedure by a user equipment in a wireless communication system.

Technical Solution

In an aspect, a method for performing a cell search procedure by a user equipment in a wireless communication system includes receiving a primary synchronization signal (PSS), and obtaining a correlation value of the PSS to detect a multimedia broadcast multicast service (MBMS) indicator indicating whether a service is a dedicated MBMS.

In another aspect, a method for performing a cell search procedure by a user equipment in a wireless communication system includes receiving a PSS; receiving a secondary synchronization signal (SSS) for frame synchronization through an estimated channel by using the PSS, and detecting an MBMS indicator indicating whether a service is a dedicated MBMS and expressed with phase modulation of the SSS.

In another aspect, a method for transmitting a downlink synchronization signal in a wireless communication system includes transmitting a first PSS, and transmitting a second PSS, wherein the first PSS and the second PSS have a conjugate symmetry relation in which a correlation value is obtained with one-time computation.

Advantageous Effects

Whether a service is a dedicated multimedia broadcast multicast service (MBMS) is indicated using a primary synchronization signal or a secondary synchronization signal used in an initial cell search process, and whether the service is the dedicated MBMS can be known without additional complexity. Therefore, cell search of a user equipment can be more effectively performed.

MODE FOR THE INVENTION

Figure 1:
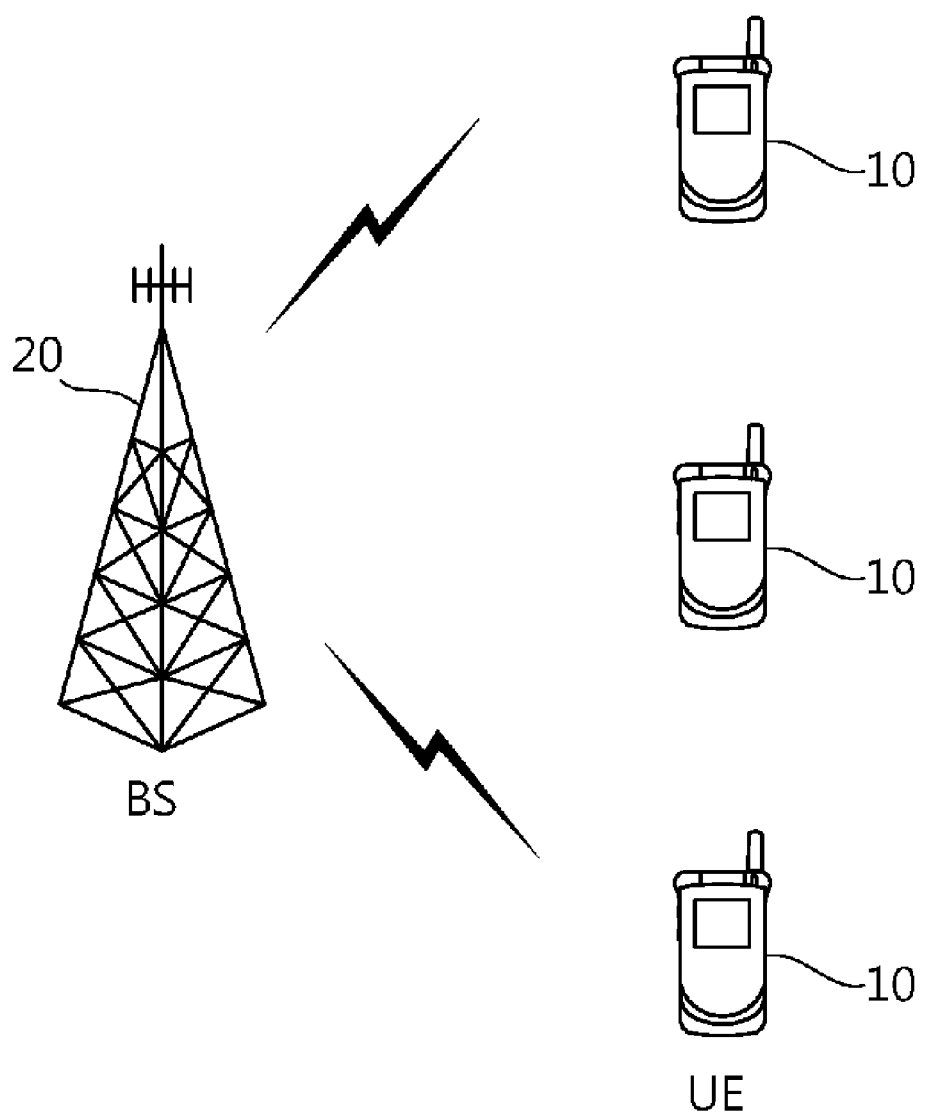
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink represents a communication link from the BS 20 to the UE 10, and an uplink represents a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Figure 2:
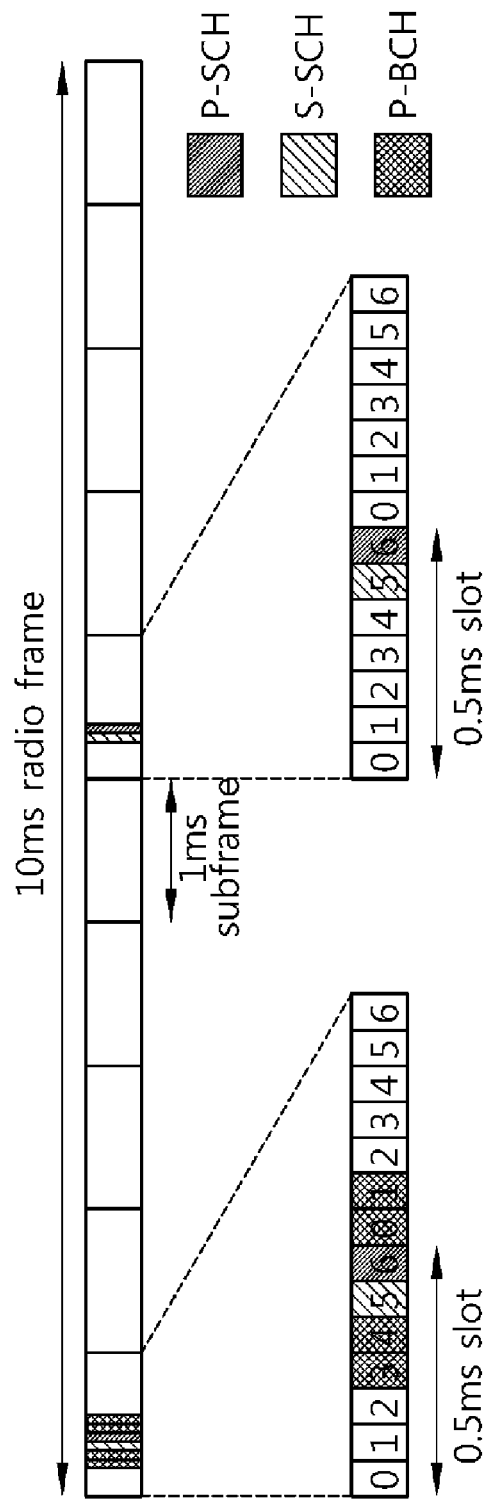
FIG. 2 shows an exemplary structure of a radio frame when the radio frame uses a normal cyclic prefix (CP).

FIG. 2 shows an exemplary structure of a radio frame. The radio frame uses a normal cyclic prefix (CP).

Referring to FIG. 2, the radio frame may consist of 10 subframes, and one subframe may include two slots. One slot may include a plurality of OFDM symbols in a time domain. The number of OFDM symbols included in one slot may be determined variously according to a CP structure. In a radio frame using a normal CP size, one slot may include 7 OFDM symbols. When an OFDM symbol has a length of 2048 Ts in a radio frame having a length of 10 ms, the normal CP size may be 144 Ts (i.e., Ts=1/(15000×2048)sec).

A primary synchronized channel (P-SCH) is located in a last OFDM symbol in each of a $0^{th}$ slot and a $10^{th}$ slot. The same primary synchronization signal (PSS) is transmitted through two P-SCHs. The P-SCH is used to obtain time domain synchronization and/or frequency domain synchronization such as OFDM symbol synchronization, slot synchronization, etc. A Zadoff-Chu (ZC) sequence may be used for the PSS. The wireless communication system has at least one PSS.

The ZC sequence is one type of a constant amplitude zero auto-correlation (CAZAC) sequence that is an orthogonal sequence. If $N_{ZC}$ denotes a length of the CAZAC sequence and is a positive integer, and if u denotes a root index and is a relatively prime to $N_{ZC}$ (where u is a natural number less than or equal to $N_{ZC}$ and is relatively prime to $N_{ZC}$), then a $k^{th}$ element of a $u^{th}$ CAZAC sequence can be expressed by Equation 1 below (where k=0, 1, ..., $N_{ZC}-1$).

MathFigure 1

$$d^u(k) = \exp\left\{-j\frac{\pi u k(k+1)}{N_{ZC}}\right\} \text{ when } N_{ZC} \text{ is odd number} \quad [\text{Math. 1}]$$
$$d^u(k) = \exp\left\{-j\frac{\pi u k^2}{N_{ZC}}\right\} \text{ when } N_{ZC} \text{ is even number}$$

A CAZAC sequence d(k) has three characteristics as follows.

MathFigure 2

$$|d(k)| = 1 \text{ for all } k, N_{ZC}, u \quad [\text{Math. 2}]$$

MathFigure 3

$$R_{u;N_{ZC}}(m) = \begin{cases} 1, & \text{for } m = 0 \\ 0, & \text{for } m \neq 0 \end{cases} \quad [\text{Math. 3}]$$

MathFigure 4

$$R_{u_1;u_2;N_{ZC}}(m) = const \text{ for all } u_1, u_2 \quad [\text{Math. 4}]$$

Equation 2 shows that the ZC sequence always has a size of 1. Equation 3 shows that auto-correlation of the ZC sequence is indicated by a Dirac-delta function. The auto-correlation is based on circular correlation. Equation 4 shows that cross correlation is always constant.

A secondary synchronization channel (S-SCH) is located in an immediately previous OFDM symbol of the last OFDM symbol in each of the $0^{th}$ slot and the $10^{th}$ slot. The S-SCH and the P-SCH may be located in contiguous OFDM symbols. Different secondary synchronization signals (SSSs) are transmitted through two S-SCHs. The S-SCH is used to obtain frame synchronization and/or CP configuration of a cell, that is, usage information of a normal CP or an extended CP. One S-SCH uses two SSSs. An m-sequence may be used for the SSS. That is, one S-SCH includes two m-sequences. For example, if one S-SCH includes 63 subcarriers, two m-sequences each having a length of 31 are mapped to one S-SCH.

The m-sequence is one of pseudo-noise (PN) sequences. The PN sequence can be reproduced and shows a characteristic similar to a random sequence. The PN sequence is characterized as follows. (1) A repetition period is sufficiently long. If a sequence has an infinitely long repetition period, the sequence is a random sequence. (2) The number of 0s is close to the number of is within one period. (3) A portion having a run length of 1 is ½, a portion having a run length of 2 is ¼, a portion having a run length of 3 is ⅛, and so on. Herein, the run length is defined as the number of contiguous identical symbols. (4) A cross-correlation between sequences within one period is significantly small. (5) A whole sequence cannot be reproduced by using small sequence pieces. (6) Reproducing is possible by using a proper reproducing algorithm. A PN sequence includes an m-sequence, a gold sequence, a Kasami sequence, etc. In addition to the aforementioned characteristics, the m-sequence has an additional characteristic in which a side lobe of a periodic auto-correlation is −1

The P-SCH and the S-SCH are used to obtain physical-layer cell identities (IDs). The physical-layer cell ID can be expressed by 168 physical-layer ID groups and 3 physical-layer IDs belonging to each physical-layer ID group. That is, a total number of physical-layer cell IDs is 504, and the physical-layer cell IDs are expressed by a physical-layer ID group in the range of 0 to 167 and physical-layer IDs included in each physical-layer cell ID and having a range of 0 to 2. The P-SCH may use 3 ZC sequence root indices indicating the physical-layer IDs. The S-SCH may use 168 m-sequence indices indicating the physical-layer cell ID groups.

A physical-broadcast channel (P-BCH) is located in a $0^{th}$ subframe in the radio frame. The P-BCH starts from a $3^{rd}$ OFDM symbol (the most preceding OFDM symbol is a $0^{th}$ OFDM symbol) of the $0^{th}$ subframe and occupies 4 OFDM symbols excluding the P-SCH and the S-SCH. The P-BCH is used to obtain basic system configuration information of a corresponding BS. The P-BCH may have a period of 40 ms.

Figure 3:
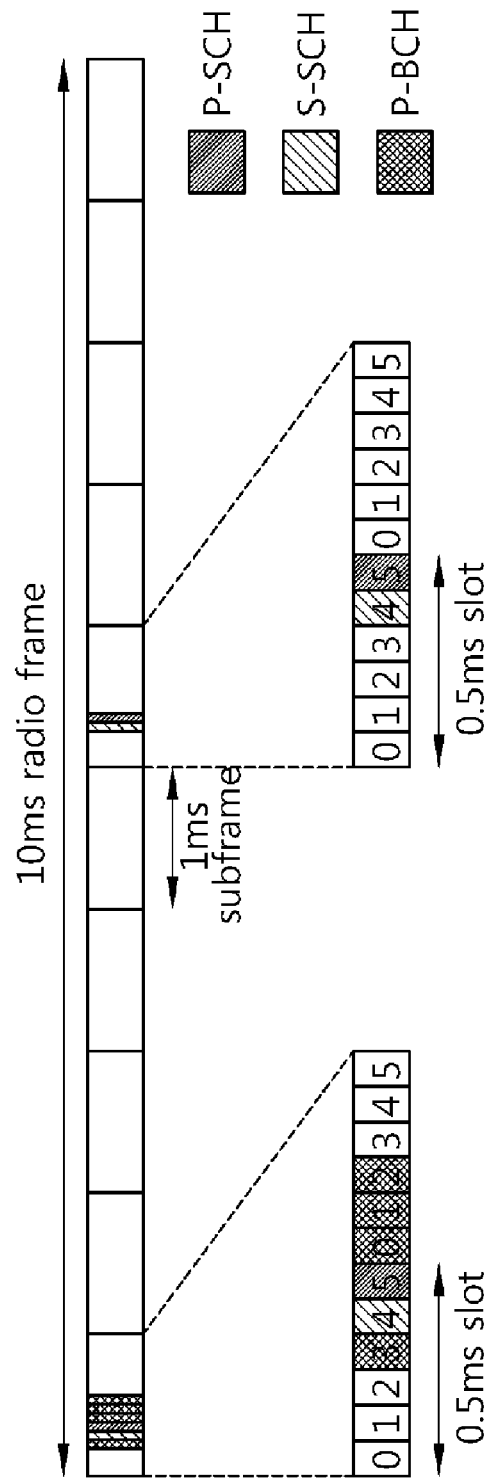
FIG. 3 shows another exemplary structure of a radio frame when the radio frame uses an extended CP.

FIG. 3 shows another exemplary structure of a radio frame. The radio frame uses an extended CP.

Referring to FIG. 3, in comparison with the radio frame using the normal CP, 6 OFDM symbols are included in one slot of the radio frame using the extended CP. If an OFDM symbol has a length of 2048 Ts in a radio frame having a length of 10 ms, a size of the extended CP may be 512 Ts (i.e., Ts=1/(15000×2048)sec).

In the radio frame using the extended CP, a P-SCH is also located in a last OFDM symbol in each of a $0^{th}$ slot and a $10^{th}$ slot, and an S-SCH is located in an immediately previous OFDM symbols of the last OFDM symbol in each of the $0^{th}$ slot and the $10^{th}$ slot. The P-BCH is located in a $0^{th}$ subframe in the radio frame. The P-BCH starts from a $3^{rd}$ OFDM symbol of the $0^{th}$ subframe and occupies four OFDM symbols excluding the P-SCH and the S-SCH.

Figure 4:
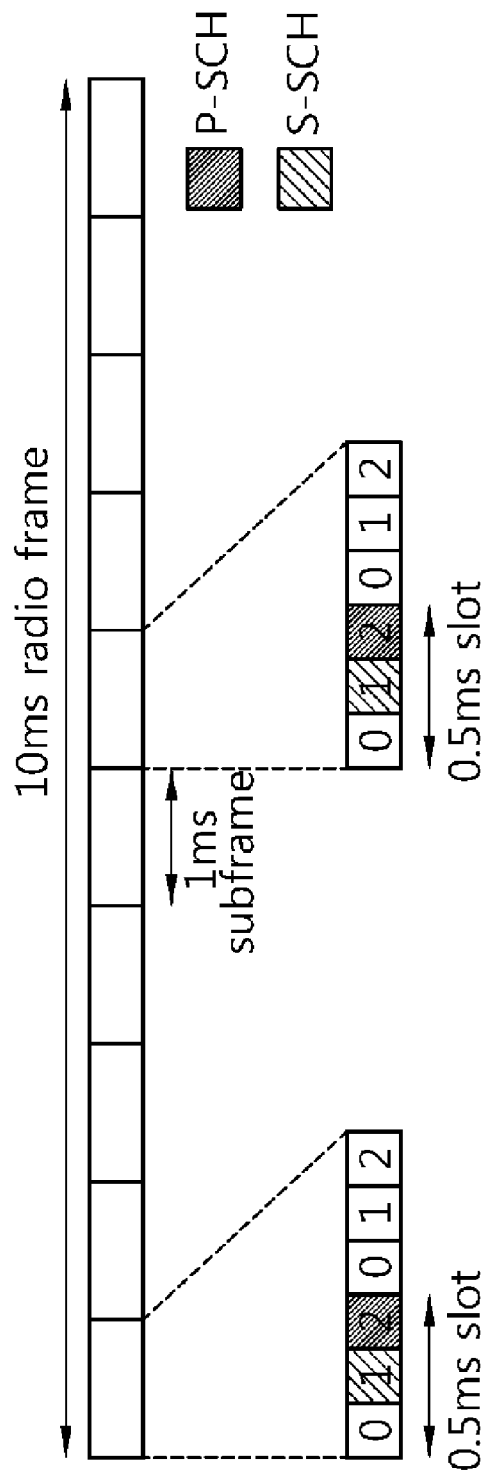
FIG. 4 shows another exemplary structure of a radio frame when the radio frame is for a dedicated multimedia broadcast multicast service (MBMS).

FIG. 4 shows another exemplary structure of a radio frame. The radio frame is for a dedicated MBMS. The dedicated MBMS is a service for providing only an MBMS. Since the same P-BCH is transmitted from all cells in the dedicated MBMS, P-BCH decoding performance is improved through single frequency network (SFN) combining.

Referring to FIG. 4, the radio frame for the dedicated MBMS may consist of 10 subframes. One subframe may include two slots. One slot may include three OFDM symbols.

In a radio frame of a system providing a unicast service, a subcarrier has a spacing of 15 kHz and an effective OFDM symbol of 2048 Ts. On the other hand, in the radio frame for the dedicated MBMS, a subcarrier may have a spacing of 7.5 kHz and an effective OFDM symbol of 4096 Ts (i.e., Ts=1/(15000×2048)sec). That is, the spacing of the subcarrier is reduced by half, and the effective OFDM symbol is doubled in size. A CP size may be 1024 Ts, that is, double of an extended CP size. Therefore, in the radio frame of 10 ms for the dedicated MBMS, one slot may include 3 OFDM symbols.

A P-SCH may be located in a last OFDM symbol in each of a $0^{th}$ and a $10^{th}$ slot. An S-SCH may be located in an immediately previous OFDM symbol of the last OFDM symbol in each of the $0^{th}$ slot and the $10^{th}$ slot. Although not shown, a P-BCH may be located in a $0^{th}$ subframe of the radio frame and may occupy at least one OFDM symbol excluding the P-SCH and the S-SCH.

The structures of the aforementioned radio frames, that is, the radio frame using the normal CP or the radio frame using the extended CP or the radio frame for the dedicated MBMS are for exemplary purposes only, and thus the number of subframes included in the radio frame and the number of slots included in the subframe may change variously. The position or number of OFDM symbols in which the P-SCH and the S-SCH are arranged on a slot are for exemplary purposes only, and thus may change variously according to a system.

Figure 5:
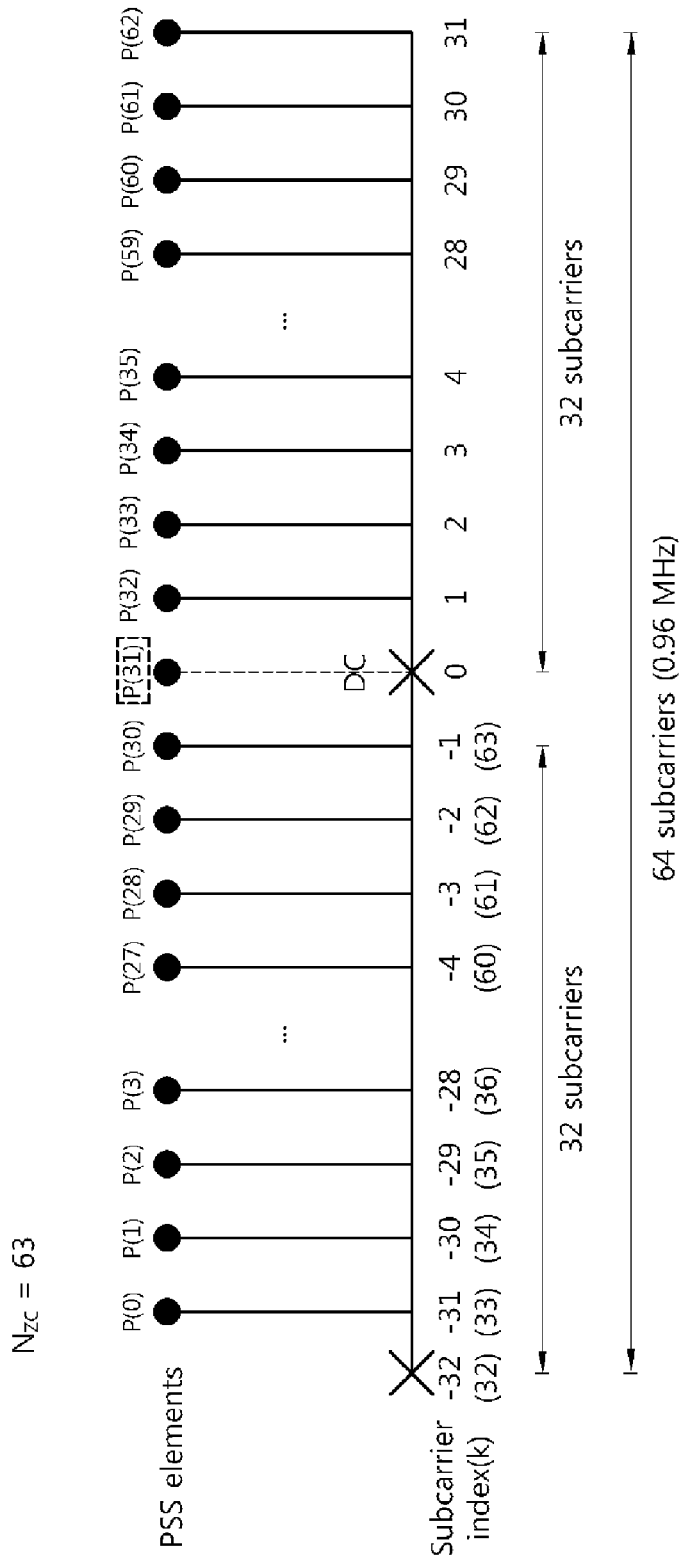
FIG. 5 shows an exemplary mapping of a sequence onto a primary synchronized channel (P-SCH) where a fast Fourier transform (FFT) window has a size of Nf=64.

FIG. 5 shows an exemplary mapping of a sequence onto a P-SCH. Herein, an FFT window has a size of Nf=64.

Referring to FIG. 5, a ZC sequence having a length of $N_{ZC}=63$ is mapped to 64 subcarriers including a direct current (DC) subcarrier. A ZC sequence is sequentially mapped starting from a leftmost subcarrier so that a center element (herein, a $31^{st}$ element P(31)) of the ZC sequence is mapped to the DC subcarrier. A null value is inserted to a subcarrier (herein, $-32^{nd}$ subcarrier) to which a sequence is not mapped in a mapping duration. The sequence P(31) mapped to the DC subcarrier is punctured.

Herein, for convenience, one side of the DC subcarrier is defined as the left side, and the opposite side thereof is defined as the right side. However, the left side and the right side may be differently defined and thus are not limited as shown in the figure. A size of the FFT window of the P-SCH and a length of the ZC sequence can be determined variously, and thus a sequence mapping scheme may also change variously. With the DC subcarrier being located in the center, the ZC sequence can be mapped symmetrically.

<Indication of Dedicated MBMS in P-SCH>

Now, a proposed method, that is, a method for indicating whether a service is a dedicated MBMS in a P-SCH, will be described.

It is assumed that, in the P-SCH, a ZC sequence having a length of $N_{ZC}=63$ is mapped to 64 subcarriers including a DC subcarrier. A ZC sequence d(n) which is a PSS transmitted through the P-SCH and has a length of $N_{ZC}=63$ can be generated by Equation 5.

MathFigure 5

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Math. 5]}$$

In this case, a root index u indicating a physical-layer ID of a physical-layer cell ID group is as shown in Table 1.

TABLE 1

| physical-layer ID | Root index u |
|---|---|
| 0 | 25 |
| 1 | 29 |
| 2 | 34 |

When 3 PSSs are used in a wireless communication system, a BS selects one of the 3 PSSs and transmits the selected PSS by carrying it on a last OFDM symbol in each of a $0^{th}$ slot and a $10^{th}$ slot.

In the proposed method, one more PSS is added so that one piece of system information is expressed by the added PSS. When transmission is simply performed by adding any PSS through the P-SCH, the number of times for performing PSS estimation by a UE increases, thereby causing increase in a processing complexity of the UE and system performance deterioration. Therefore, the proposed method additionally provides a new PSS to be used in the P-SCH and having a conjugate symmetry relation with respect to a defined PSS. This can be applied to all of a radio frame using a normal CP, a radio frame using an extended CP, and a radio frame for a dedicated MBMS. By using the PSS having the conjugate symmetry relation, whether a service is the dedicated MBMS can be indicated together with time domain synchronization and/or frequency domain synchronization.

When two root indices satisfying $u_1+u_2=N_{ZC}$ are applied to a ZC sequence root index, the ZC sequence is expressed by Equation 6.

MathFigure 6

$d^{u_2}(k)=d^{N_{ZC}-u_1}(k)=(d^{u_1}(k))^*$, when $N_{ZC}$ is odd number $d^{u_2}(k)=d^{N_{ZC}-u_1}(k)=(-1)^k \cdot (d^{u_1}(k))^*$, when $N_{ZC}$ is even number   [Math.6]

A correlation output of $u_1$ and $u_2$ has a computation amount similar to a correlation output of $u_1$ alone. The correlation output of $u_1$ and $u_2$ for time synchronization can be calculated with one-time computation. It is said that two PSSs have a conjugate symmetry relation when the two PSSs satisfy $u_1+u_2=N_{ZC}$. Alternatively, it is said that a PSS has a conjugate symmetry relation when the correlation output of $u_1$ and $u_2$ can be calculated with one-time computation.

Meanwhile, the conjugate symmetry relation of the PSS is maintained not only in a frequency domain but also in a time domain. Therefore, the PSS can be mapped not only to the frequency domain but also to the time domain.

It is assumed that the ZC sequence is transmitted by being mapped to the time domain as shown in FIG. 5 when $N_{ZC}$ is odd. In this case, if a time-domain signal is defined as au(k), a value of an intermediate buffer for calculating a final correlation value is defined as Equation 7.

MathFigure 7

$$R_{II} = \frac{1}{N}\sum_{n=0}^{N-1}(r_I(n+d)a_I^{u_1}(k))$$ [Math. 7]

$$R_{QQ} = \frac{1}{N}\sum_{n=Q}^{N-1}(r_Q(n+d)a_Q^{u_1}(k))$$

$$I_{QI} = \frac{1}{N}\sum_{n=Q}^{N-1}(r_Q(n+d)a_I^{u_1}(k))$$

$$I_{IQ} = \frac{1}{N}\sum_{n=0}^{N-1}(r_I(n+d)a_Q^{u_1}(k))$$

Herein, r(n) denotes a received signal, d denotes a delay index, and I and Q denote an in-phase (I) component and a quadrature-phase (Q) component of a complex signal.

A final correlation output of $u_1$ and $u_2$ is expressed by Equation 8.

MathFigure 8

$R^{u_1}(d)=(R_{II}-R_{QQ})-j(I_{QI}-I_{IQ})$ $R^{u_2}(d)=R^{N_{ZC}-u_1}(d)=(R_{II}-R_{QQ})-j(I_{QI}+I_{IQ})$   [Math.8]

The conjugate symmetry relation of the PSS can be maintained not only in the frequency domain but also in the time domain.

As expressed by Equation 5, among root indices 25, 29, and 34 used in the PSS for the ZC sequence having a length of $N_{ZC}=63$, the root indices 29 and 34 satisfy a condition of 29+34=63, and thus correlation values of u=29 and u=34 can be calculated at one time. That is, when a root index satisfying $u_1+u_2=N_{ZC}$ is defined as a root index used for the PSS, the UE can transmit new control information without additional increase in the computation amount.

In the PSS of Table 1, u=38 satisfying the conjugate symmetry relation with respect to u=25 can be defined as an indicator for indicating whether the service is the dedicated MBMS. The UE can indicate whether the service is the dedicated MBMS without additional increase in the computation amount.

Table 2 shows an example of the root index of the ZC sequence used in the P-SCH according to the proposed method.

TABLE 2

| physical-layer ID | Root index u |
|---|---|
| 0 | 25 |
| 1 | 29 |
| 2 | 34 |
| dedicated MBMS indicator | 38 |

Although it has been described above that a root index u=38 of the added ZC sequence satisfying the conjugate symmetry relation with respect to u=25 is used as the indicator for indicating whether the service is the dedicated MBMS, this is for exemplary purposes only. Thus, the root index of the added ZC sequence can be used to indicate a variety of system information provided to the UE through the P-SCH. Even in a case where the number of root indices of the ZC sequence used in the P-SCH is increased, the root indices of the ZC sequence satisfying the conjugate symmetry relation can be defined according to the proposed method to indicate a variety of control information.

Figure 6:
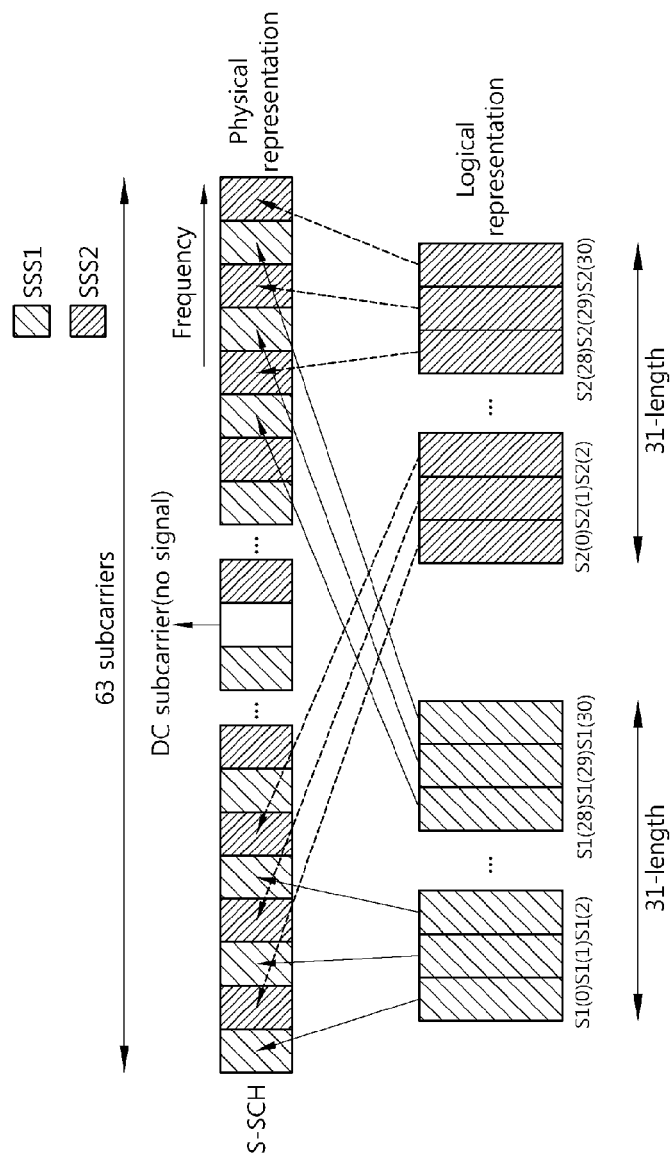
FIG. 6 shows an exemplary physical mapping of two secondary synchronization signals (SSSs) onto a secondary synchronization channel (S-SCH).

FIG. 6 shows an exemplary physical mapping of two SSSs onto an S-SCH.

Referring to FIG. 6, it is assumed that, in the S-SCH, two sequences each having a length of N=31 are mapped to 63 subcarriers including a DC subcarrier. A logical expression indicates an SSS in use. A physical expression indicates a subcarrier to which the SSS is mapped when the SSS is transmitted through the S-SCH. S1(n) denotes an nth entity of a first SSS (i.e., SSS1), and S2(n) denotes an nth entity of a second SSS (i.e., SSS2). The SSS1 and the SSS2 are mapped to a physical subcarrier in a format in which the SSS1 and the SSS2 are concatenated with each other in an interleaved manner. Such a mapping scheme is referred to as distributed mapping.

Meanwhile, the SSS1 and the SS may be mapped to the physical subcarrier in a locally concentrated manner without being interleaved. Such a mapping scheme is referred to as localized mapping.

Equation 9 shows a sequence of an SSS mapped to the S-SCH.

MathFigure 9

$$d(2n) = \begin{cases} s_0^{(m_0)}(n)c_0(n) & \text{in slot } 0 \\ s_1^{(m_1)}(n)c_0(n) & \text{in slot } 10 \end{cases}$$

$$d(2n+1) = \begin{cases} s_1^{(m_1)}(n)c_1(n)z_1^{(m_0)}(n) & \text{in slot } 0 \\ s_0^{(m_0)}(n)c_1(n)z_1^{(m_1)}(n) & \text{in slot } 10 \end{cases}$$ [Math. 9]

Herein, $s_x^{(m)}(n)$ denotes the SSS, $c_x^{(n)}$ denotes a PSS based-scrambling code, and $z_x^{(m)}(n)$ denotes a segment based scrambling code. The SSS is scrambled into two scrambling codes.

Equation 10 shows a generating polynomial of an m-sequence for generating the SSS and PSS-based scrambling code and the segment based scrambling code.

MathFigure 10

$$s_x = x^5 + x^2 + 1$$

$$c_x = x^5 + x^3 + 1$$

$$z_x = x^5 + x^4 + x^2 + x^1 + 1$$ [Math.10]

The SSS and PSS-based scrambling code and the segment based scrambling code use a cyclic shift version of a sequence generated from the generating polynomial of the m-sequence.

<Indication of Dedicated MBMS in S-SCH>

Now, a method for indicating whether a service is a dedicated MBMS through an S-SCH will be described.

Figure 7:
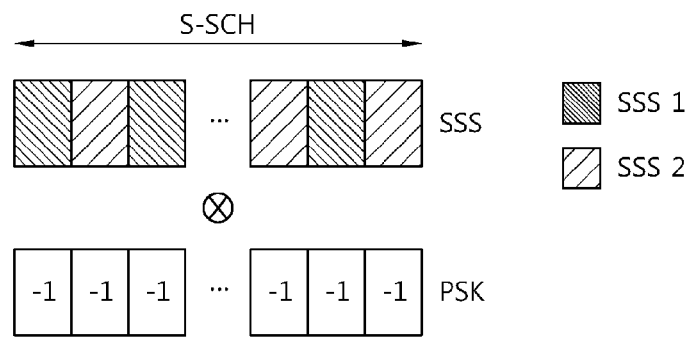
FIG. 7 shows an exemplary mapping of an SSS onto an S-SCH to indicate whether a service is a dedicated MBMS.

FIG. 7 shows an exemplary mapping of an SSS onto an S-SCH to indicate whether a service is a dedicated MBMS.

Referring to FIG. 7, a phase modulation can be performed on the SSS in the S-SCH, and whether the service is the dedicated MBMS can be indicated with the phase modulation of the S-SCH. The phase modulation implies that an M-phase shift key (PSK) symbol is modulated with a signal to be mapped to a subcarrier in a frequency domain or a time domain. For example, 1-bit information can be additionally provided using a binary phase shift key (BPSK) symbol, and 2-bit information can be additionally provided using a quadrate phase shift key (QPSK) symbol. M-PSK modulation is a scheme capable of carrying additional information without affecting sequence detection performance. There is no restriction on the M-PSK, and thus the M-PSK may be 8-PSK, 16-PSK, etc. The phase modulation of the SSS may be performed on a logically expressed SSS or may be performed on a physically expressed SSS.

It is assumed that a first SSS (i.e., SSS1) and a second SSS (i.e., SSS2) are mapped to the S-SCH according to a distributed mapping scheme. In this case, whether the service is the dedicated MBMS can be indicated using a BPSK symbol. If the service is the dedicated MBMS, the S-SCH may be modulated with −1, and if the service is not the dedicated MBMS, the S-SCH may be modulated with +1. Alternatively, if the service is the dedicated MBMS, the S-SCH may be modulated with +1, and if the service is not the dedicated MBMS, the S-SCH may be modulated with −1. When the S-SCH to which the SSS1 and the SSS2 are mapped is expressed as (SSS1, SSS2), a signal transmitted through the S-SCH modulated with +1 is (+SSS1, +SSS2), and a signal transmitted through the S-SCH modulated with −1 is (−SSS1, −SSS2).

Although it is described herein that one S-SCH is used, both a first S-SCH and a second S-SCH of the radio frame may be modulated with −1 or +1, or only one of the first S-SCH and the second S-SCH may be modulated with −1 or +1. In addition, other control information in addition to information indicating whether the service is the dedicated MBMS can be indicated by modulating an M-PSK symbol to any one of the SSS1 and the SSS2. For example, a signal expressed as (+SSS1, −SSS2), a signal expressed as (−SSS1, +SSS2), etc., may be transmitted through the S-SCH, and the signals may imply other control signals.

In general, cell search is classified into initial cell search initially performed when a UE is powered on and non-initial cell search for performing handover or neighbor cell measurement. The following description will focus on the initial cell search as an example. However, the technical features of the present invention can apply to the non-initial cell search without modification.

A downlink channel (i.e., P-SCH and S-SCH) is used in the cell search. The P-SCH is used when the UE obtains slot synchronization and/or frequency synchronization. The S-SCH is used when the UE obtains frame synchronization and a physical-layer cell ID group.

Figure 8:
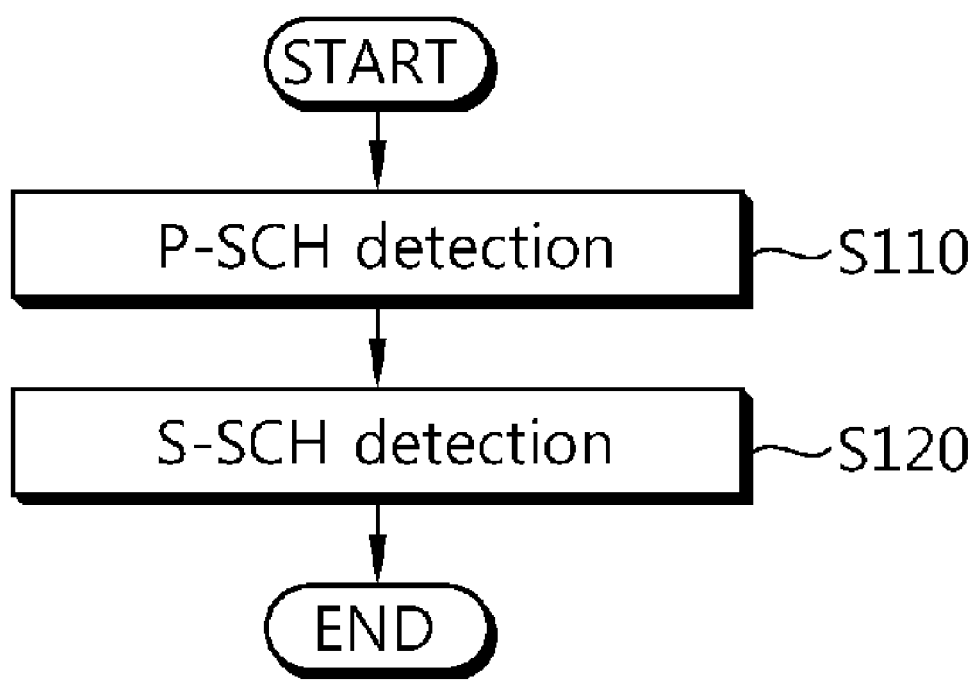
FIG. 8 is a flowchart showing a cell search method according to an embodiment of the present invention.

FIG. 8 is a flowchart showing a cell search method according to an embodiment of the present invention.

Referring to FIG. 8, a UE searches for a P-SCH (step S110). The UE obtains slot synchronization or symbol synchronization through the P-SCH. In addition, frequency synchronization can also be obtained through the P-SCH. When power is supplied the UE, the UE performs system synchronization of an initial cell and detects a physical-layer cell ID which is unique for each cell. The initial cell is determined according to a signal-to-interference plus noise ratio (SINR) of the UE at a time when the power is supplied. In general, the initial cell denotes a cell of a BS corresponding to the greatest signal component among signal components of all BSs, wherein the signal components are included in a downlink reception signal of the UE.

When a dedicated MBMS indicator is transmitted through the P-SCH, the UE can detect the dedicated MBMS indicator through the P-SCH. The UE can calculate correlation values of two PSSs having a conjugate symmetry relation in the P-SCH at one time. For example, in Table 2, the UE can detect the dedicated MBMS indicator by calculating a correlation value of u=25 or u=38. Since the UE can calculate the correlation values of the two PSSs having the conjugate symmetry relation with one-time computation, the UE can detect the dedicated MBMS indicator together with a PSS indicating a physical-layer ID without increase in a computation amount. Upon detecting the dedicated MBMS indicator, the UE can use an MBMS according to a defined dedicated MBMS radio frame.

Subsequently, the UE searches for an S-SCH (step S120). The UE obtains frame synchronization through the S-SCH. In addition, the UE obtains cell ID information by using an SSS of the S-SCH and a PSS of the P-SCH. Further, the UE can obtain antenna configuration or other information.

When the dedicated MBMS indicator is transmitted through the S-SCH, the UE can detect the dedicated MBMS indicator through the S-SCH. The UE estimates a channel by using the PSS transmitted through the P-SCH. Thereafter, the UE compensates for the estimated channel with respect to the S-SCH, and then detects the SSS. When the SSS is detected, the UE can detect the MBMS indicator by using only a modulated phase component, and an additional detection process is not required. That is, the UE can detect the SSS by performing the same process irrespective of whether phase modulation is performed on the SSS or not, and thus can know whether the service is the dedicated MBMS.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for performing a cell search procedure by a user equipment in a wireless communication system, the method comprising:
   receiving a primary synchronization signal (PSS) from a base station; and
   obtaining a correlation value of the PSS to detect a multimedia broadcast multicast service (MBMS) indicator indicating whether a service provided by the base station is related to a dedicated MBMS,
   wherein the PSS is generated based on a Zadoff-Chu (ZC) sequence having a length of $N_{ZC}$, and
   wherein the MBMS indicator corresponds to one of two ZC sequences corresponding to root indices $u_1$ and $u_2$ satisfying $u_1+u_2=N_{ZC}$, where $N_{ZC}$ is a positive integer, and $u_1$ and $u_2$ are relatively prime to $N_{ZC}$.

2. The method of claim 1, wherein a remaining one of the two ZC sequences corresponds to a physical cell identity of the base station.

3. The method of claim 1, further comprising receiving a secondary synchronization signal (SSS) for frame synchronization.

4. A user equipment configured for performing a cell search procedure in a wireless communication system, comprising a processor configured to:
   receive a primary synchronization signal (PSS) from a base station; and
   obtain a correlation value of the PSS to detect a multimedia broadcast multicast service (MBMS) indicator indicating whether a service provided by the base station is related to a dedicated MBMS,
   wherein the PSS is generated based on a Zadoff-Chu (ZC) sequence having a length of $N_{ZC}$, and
   wherein the MBMS indicator corresponds to one of two ZC sequences corresponding to root indices $u_1$ and $u_2$ satisfying $u_1+u_2=N_{ZC}$, where $N_{ZC}$ is a positive integer, and $u_1$ and $u_2$ are relatively prime to $N_{ZC}$.

5. The user equipment of claim 4, wherein a remaining one of the two ZC sequences corresponds to a physical cell identity of the base station.

* * * * *